United States Patent
Bergman et al.

(10) Patent No.: US 10,084,800 B2
(45) Date of Patent: Sep. 25, 2018

(54) CONTENT REQUEST RATE LIMITING IN A CONTENT DELIVERY SYSTEM

(71) Applicant: Fastly, Inc., San Francisco, CA (US)

(72) Inventors: Artur Bergman, San Francisco, CA (US); Tyler McMullen, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 18 days.

(21) Appl. No.: 14/966,667

(22) Filed: Dec. 11, 2015

(65) Prior Publication Data

US 2016/0099958 A1    Apr. 7, 2016

Related U.S. Application Data

(63) Continuation of application No. 14/013,909, filed on Aug. 29, 2013, now Pat. No. 9,215,248.

(60) Provisional application No. 61/695,483, filed on Aug. 31, 2012.

(51) Int. Cl.
*G08B 23/00* (2006.01)
*G06F 12/16* (2006.01)
*G06F 12/14* (2006.01)
*G06F 11/00* (2006.01)
*H04L 29/06* (2006.01)

(52) U.S. Cl.
CPC ...... *H04L 63/1416* (2013.01); *H04L 63/1458* (2013.01)

(58) Field of Classification Search
CPC ................. H04L 63/1416; H04L 63/1458
USPC .......................................................... 726/23
See application file for complete search history.

(56) References Cited

U.S. PATENT DOCUMENTS

| 7,389,537 B1 * | 6/2008 | Callon | H04L 47/10 |
| | | | 713/153 |
| 7,779,465 B2 | 8/2010 | Baker et al. | |
| 9,032,077 B1 * | 5/2015 | Klein | H04L 29/08 |
| | | | 370/395.21 |
| 2004/0264371 A1 * | 12/2004 | Chen | H04L 47/20 |
| | | | 370/229 |
| 2005/0060573 A1 * | 3/2005 | D'Souza | H04L 63/1458 |
| | | | 726/4 |
| 2009/0013404 A1 | 1/2009 | Chow et al. | |
| 2009/0300759 A1 | 12/2009 | Wang et al. | |

(Continued)

OTHER PUBLICATIONS

Mohit Aron, Scalable content-aware request distribution in Cluster-based network server, Usenix technical conference, Jun. 2000; p. 1-15.*

(Continued)

*Primary Examiner* — Monjour Rahim

(57) ABSTRACT

Systems, methods, and software for operating a content delivery node to monitor requests for content transferred by at least an end user device to detect when the requests comprise an attack on the content delivery node. Responsive to detecting the attack on the content delivery node, the content delivery node establishes a rate limit in the content delivery node on at least the requests for the content associated with the end user device, and transfers an indication of the attack comprising the rate limit for delivery to another content delivery node that directs the other content delivery node to apply the rate limit to further requests for the content before the further requests are received by the other content delivery node.

20 Claims, 2 Drawing Sheets

(56) References Cited

U.S. PATENT DOCUMENTS

| | | | |
|---|---|---|---|
| 2010/0050260 A1 | 2/2010 | Nakakoji et al. | |
| 2010/0082513 A1 | 4/2010 | Liu | |
| 2010/0274893 A1* | 10/2010 | Abdelal | H04L 29/0602 |
| | | | 709/224 |
| 2011/0197274 A1* | 8/2011 | Callon | H04L 47/10 |
| | | | 726/22 |
| 2011/0283359 A1* | 11/2011 | Prince | H04L 63/1458 |
| | | | 726/23 |
| 2014/0047542 A1* | 2/2014 | Holloway | H04L 63/1458 |
| | | | 726/23 |
| 2014/0150095 A1 | 5/2014 | Zhao et al. | |

OTHER PUBLICATIONS

Benson, Theophilus et al. "Network Traffic Characteristics of Data Centers in the Wild." Berkeley University; p. 1-14 (2010).

* cited by examiner

CONTENT REQUEST RATE LIMITING IN A CONTENT DELIVERY SYSTEM

RELATED APPLICATIONS

This patent application is a continuation of U.S. patent application Ser. No. 14/013,909 that was filed on Aug. 29, 2013 and that is entitled "USER ACCESS RATE LIMITING AMONG CONTENT DELIVERY NODES." U.S. patent application Ser. No. 14/013,909 is hereby incorporated by reference into this patent application. This patent application and U.S. patent application Ser. No. 14/013,909 also both claim benefit to the priority of U.S. Provisional Patent Application No. 61/695,483, filed on Aug. 31, 2012, and entitled "USER ACCESS RATE LIMITING AMONG CONTENT DELIVERY NODES," which is hereby incorporated by reference in its entirety.

TECHNICAL FIELD

Aspects of the disclosure are related to the field of computing and data storage systems, and in particular, rate limiting of content access requests in content delivery nodes of a content delivery system.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery systems have been developed which add a layer of caching between the origin servers of the content providers and the end users. The content delivery systems typically have one or more content delivery nodes distributed across a large geographic region to provide faster and lower latency access to the content for the end users. When end users request content, such as a web page, which is handled through a content delivery node, the content delivery node is configured to respond to the end user requests instead of the origin servers. In this manner, a content delivery node can act as a proxy for the origin servers.

Content of the origin servers can be cached into the content delivery nodes, and can be requested via the content delivery nodes from the origin servers of the content originators when the content has not yet been cached. Content delivery nodes usually cache only a portion of the original source content rather than caching all content or data associated with an original content source. The content delivery nodes can thus maintain only recently accessed and most popular content as cached from the original content sources. Thus, content delivery nodes exchange data with the original content sources when new or un-cached information is requested by the end users or if something has changed in the original content source data.

In some instances, an end user device may be configured to "attack" server equipment by repeatedly and frequently requesting content from a content provider, or cause the server equipment to process many content-related tasks at once, among other operations. For example, during a network bot attack, a denial of service (DoS) attack, or a distributed denial of service (DDoS) attack, one or more end user devices can request network content at a frequent pace so as to overload or crash network equipment. In cases where an origin server alone serves the network content, the origin server can quickly become overloaded by the frequent content requests and crash.

OVERVIEW

Systems, methods, and software for operating a content delivery node to monitor requests for content transferred by at least an end user device to detect when the requests comprise an attack on the content delivery node. Responsive to detecting the attack on the content delivery node, the content delivery node establishes a rate limit in the content delivery node on at least the requests for the content associated with the end user device, and transfers an indication of the attack comprising the rate limit for delivery to another content delivery node that directs the other content delivery node to apply the rate limit to further requests for the content before the further requests are received by the other content delivery node.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents

DESCRIPTION

Figure 1:
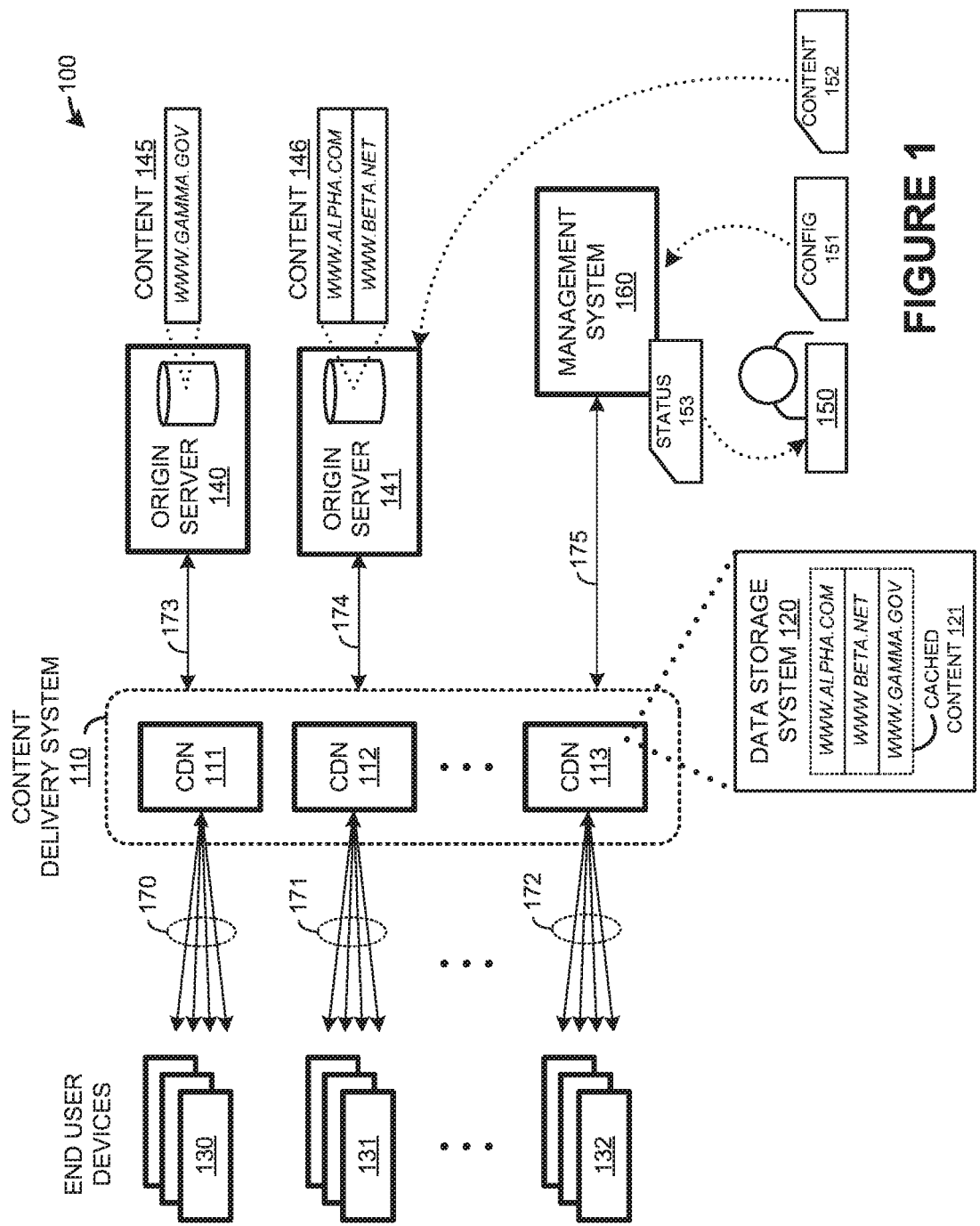
FIG. 1 is a system diagram illustrating a communication system.

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. The network content includes example website content referenced in FIG. 1, such as "www.gamma.gov," "www.alpha.com," and "www.beta.net," among others. In some examples, origin servers can serve the content to end user devices. However, when a content delivery system is employed, the content delivery system can act as a proxy to cache content delivery between origin servers and the end user devices.

Content delivery systems can add a layer of caching between origin servers of the content providers and the end users. The content delivery systems typically have one or more content delivery nodes distributed across a large geographic region to provide faster and lower latency local access to the content for the end users. When end users request content, such as a web page, a locally proximate content delivery node will respond to the content request instead of the associated origin server. Various techniques can be employed to ensure the content delivery node responds to content requests instead of the origin servers, such as associating web content of the origin servers with network addresses of the content delivery nodes instead of network addresses of the origin servers using domain name system (DNS) registration and lookup procedures.

Patterns of requests for network content from end user devices typically track end user behavior, such as an end user browsing web pages in a web browser application. However, in some instances, an end user device may be configured to repeatedly and frequently request content from a content provider. For example, during a network bot attack, a denial of service (DoS) attack, or a distributed denial of service (DDoS) attack, one or more end user devices request network content at a frequent pace so as to overload or crash network equipment. In cases where an origin server alone serves the network content, the origin server can quickly become overloaded by the frequent content requests and crash. In examples, such as in FIG. 1, when content delivery nodes are employed, a much higher volume and frequency of content requests can be handled by individual CDNs and by the entire content delivery system. However, slowdowns, crashes, and failures can still occur when a content delivery system is employed.

Individual content delivery nodes can have individual "rate limits" which limit the frequency or rate at which a content request is responded to or otherwise handled. Problems may arise when attacking or malicious end user devices request network content from multiple ones of the CDNs. For example, if a first CDN is "crashed" or overloaded by an attacker, another CDN may respond to the content requests, escalating the attack to further CDNs. However, when the first CDN employs rate limiting to attenuate a high frequency of content requests from an attacker, these content requests may also be routed to another CDN, creating a similar situation to when the first CDN crashes or is overloaded. Therefore, as described herein, rate limiting is employed across an entire content delivery system, where if a first CDN identifies an attacking end user device, then further CDNs are notified of the attack, and can apply rate limiting to the attacker before the further CDNs experience slowdowns or crashes.

As a first example employing a content delivery system, FIG. 1 is presented. FIG. 1 is a system diagram illustrating communication system 100. Communication system 100 includes content delivery system 110, end user devices 130-132, origin servers 140-141, and management system 160. Content delivery system 110 includes one or more content delivery nodes (CDN) 111-113. Each of CDN 111-113 can include one or more data storage systems, such as that illustrated for CDN 113 as data storage system 120. End user devices 130-132 are representative of a plurality of end user devices which can request and receive network content, and any number of end user devices 130-132 can be associated with each of content delivery nodes 111-113. CDN 111-113 and ones of end users 130-132 communicate over associated network links 170-172. Content delivery system 110 and origin servers 140-141 communicate over associated network links 173-174. Content delivery system 110 and management system 160 communicate over link 175. Although not shown in FIG. 1 for clarity, each of CDN 111-113 can also communicate with each other over network links, such as over packet networks or the Internet.

To further illustrate FIG. 1, a brief description of the operation of communication system 100 is included. In operation, end user devices 130-132 request network content, such as content 145-146 associated with origin servers 140-141. Instead of these requests being handled by the individual origin servers 140-141, individual content delivery nodes 111-113 of content delivery system 110 receive the content requests over ones of links 170-172 and processes the content requests for delivery of the content to the associated end user devices 130-132. Requested network content that is already stored in ones of CDN 111-113 can be provided quickly to the end user devices, while network content that is not already stored in ones of CDN 111-113 can be responsively requested by an associated one of CDN 111-113 from an appropriate origin server 140-141 for delivery by the CDN and possible caching by the CDN. In this manner, each of CDN 111-113 can act as intermediary proxy nodes to provide local and fast access for end user devices 130-132 to network content of origin servers 140-141 without burdening origin servers 140-141. FIG. 1 shows cached content 121 included in data storage system 120 of CDN 113 as comprised of content 145-146, and thus content, 145-146 is currently shown as cached by CDN 113. Other configurations are possible, including subsets of content 145-146 being cached in individual ones of CDN 111-113.

Although FIG. 1 shows content 145-146 of origin servers 140-141 being cached by data storage system 120, other content can be handled by CDN 111-113. For example, dynamic content generated by activities of end user devices 130-132 need not originally reside on origin servers 140-141, and can be generated due to scripting or code included in web page content delivered by CDN 111-113. This dynamic content can also be cached by ones of CDN 111-113, and can be specific to a particular end user device during a communication session.

Management system 160 handles configuration changes and status information collection and delivery for system operators and for the origin server operators or managers. For example, operator device 150 can transfer configuration 151 for delivery to management system 160, where configuration 151 can alter the handling of network content requests by CDN 111-113, among other operations. Also, management system 160 can monitor status information for the operation of CDN 111-113, such as operational statistics, and provide this status information as 153 to operator device 150. Furthermore, operator device 150 can transfer content 152 for delivery to origin servers 140-141 to include in content 145-146. Although one operator device 150 is shown in FIG. 1, it should be understood that this is merely representative and communication system 100 can include many operator devices for receiving status information, providing configuration information, or transferring content to origin servers.

Figure 2:
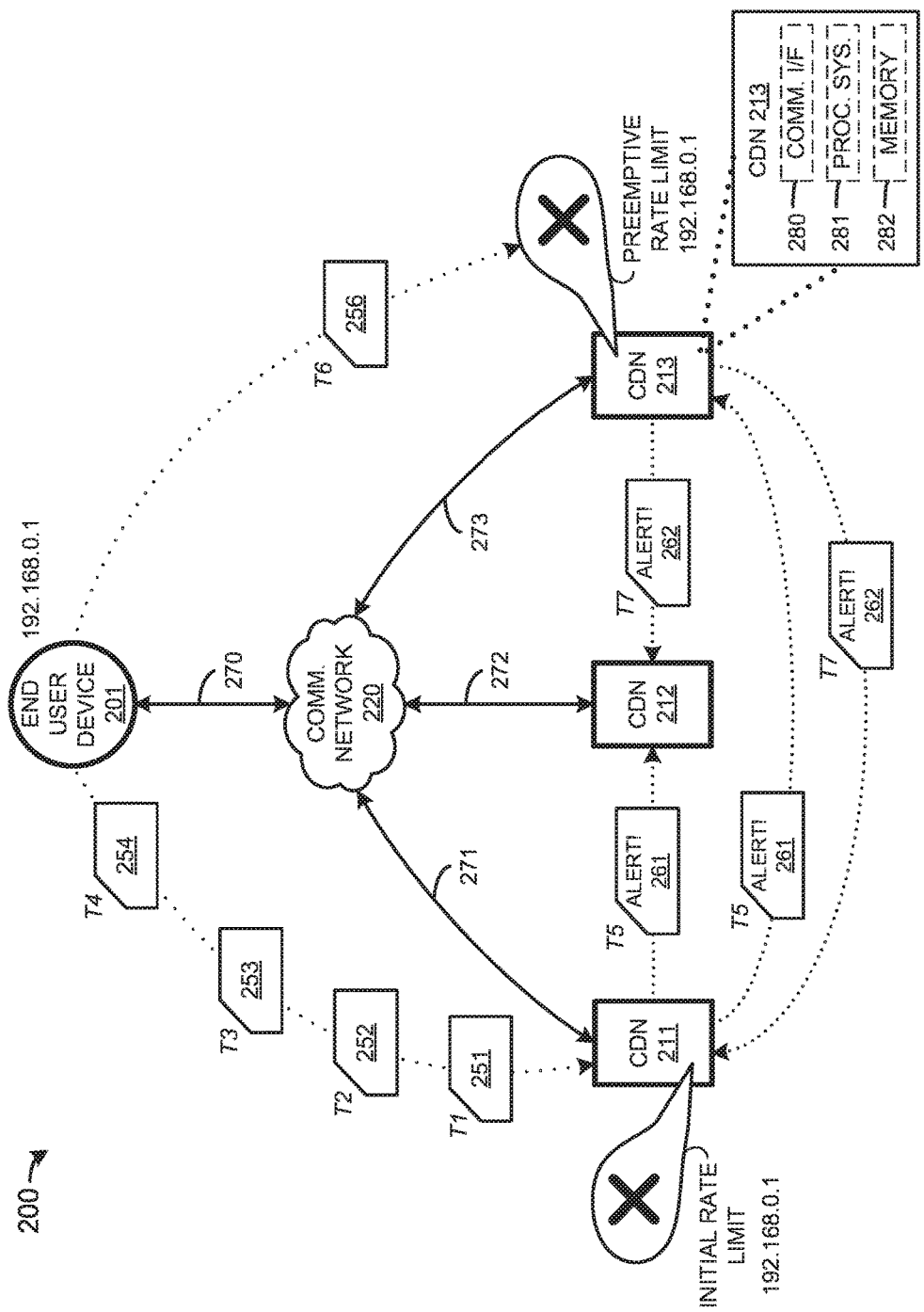
FIG. 2 is a system diagram illustrating a communication system.

To further illustrate the rate limiting and rate limit information distribution features of FIG. 1, FIG. 2 is provided. FIG. 2 is a system diagram illustrating communication system 200. Communication system 200 includes end user device 201, content delivery nodes (CDN) 211-213, and communication network 220. End user device 201 and communication network 220 communicate over network link 270. Each of CDN 211-213 and communication network 220 communicate over associated network links 271-273. CDN 211-213 can communicate with each other over communication network 220 via links 271-273. In this example, network links 270-273 comprise Internet protocol (IP) packet network links.

Although three CDNs are included in FIG. 2, it should be understood that one or more CDNs can be included, and distributed across a large geographic area, such as globally.

CDN 211-213 can be examples of CDN 111-113 of FIG. 1, although variations are possible. Also, end user device 201 can be an example of end user devices 130-132 of FIG. 1, although variations are possible. Communication network 220 is a packet network in this example, and can include routers, switches, bridges, network links, and other network equipment. Communication network 220 can comprise the Internet, among other packet networks.

In operation, end user device 201 can transfer content requests for network content, such as web page content. End user device 201 has IP address "192.168.0.1" associated therewith as an exemplary network address or network identifier. The IP address of end user device 201 can be included in a content request received by any of CDN 211-213. In this example, CDN 211 initially responds to content requests issued by end user device 201.

A sequence of content requests can be seen in FIG. 2 as content requests 251-254, which occur at associated times T1-T4. CDN 211 monitors content requests 251-254 and determines if T1-T4 of content requests 251-254 occur within a threshold timeframe, or above a threshold frequency to identify end user device 201 as malicious or attacking. If end user device 201 is identified as malicious or attacking then CDN 211 establishes a rate limit for further content requests from end user device 201. End user device 201 can be identified by any network identifier associated therewith, such as "192.168.0.1," and any further content requests from that IP address or other network identifier can be rate limited. In other examples, end user device 201 may or may not be rate limited, while any requests for the content requested in content requests 251-254 (i.e. any content requested above a frequency threshold) can be rate limited. It should be understood that the term "attack" or "malicious" is used herein, but end user device 201 need not have any user intention behind the actions shown in FIG. 2. For example, end user device 201 may be malfunctioning and issuing an undesirably high frequency of content requests.

A rate limit can include any limits placed on how frequently or at what rate a response to a content request is issued, how often a content request can be processed, or how often content responsive to a content request is delivered, among other rate limits. Rate limiting can also limit the number of times an end user device may request content, restrict the total volume of traffic received or responded to by a CDN, or restrict a total amount of content requests for specific content from all content requestors. When implemented, the rate limit can reduce a frequency at which end user device may receive processing attention, such as responses to content requests, processing time for scripts and/or dynamic content, or other attention. The rate limiting may change a grant frequency for content requests to a slower frequency; such as a 1 request-per-second initial rate/frequency reduced to a 1 request-per-10 second rate/frequency. In further examples, a rate limit includes rejection of all content requests from a particular end user device, or a rejection of all content requests for specific content from a particular end user device.

Responsive to a rate limit being implemented at CDN 211, CDN 211 send alert messages 261 to other CDNs, namely CDN 212-213, at time T5. CDN 212-213 can receive alert message 261 and responsively rate limit, such as rate limiting content requests from the IP address associated with end user device 201, or rate limiting content requested by end user device 201. Due to the distributed and load-sharing nature of each of CDN 211-213 and of packet networks, if a content request is not acknowledged or responded to quickly by CDN 211 due to rate limiting at CDN 211, then another CDN may receive the content request and attempt to respond accordingly. For example, communication network 220 or other equipment may route content requests from end user device 201 to CDN 212 or CDN 213 if CDN 211 does not respond to the content request within a threshold response time due to rate limiting being employed at CDN 211. Once CDN 212-213 receive and implement alert message 261, further requests by end user device 201 will be preemptively rate limited. Thus, if end user device 201 makes content request 256 at time T6, CDN 213 will already know of the malicious nature of end user device 201 and preemptively rate limit such content requests. Messages 261-262 can be transferred over links 271-273 and communication network 220, although any messaging avenue can be used, including direct, indirect, sideband signally, and the like. Thus, malicious activity, such as attacks to websites, can be averted and/or limited in a more rapid manner than if each CDN determines the nature of the attack separately without alert messages.

CDN 213 may rebroadcast alert message 261 as alert message 262 responsive to receiving alert message 261 to ensure redundant notification of the alert message at CDN 212 or other CDNs. In other examples, CDN 213 can issue alert notice 262 responsive to receiving content request 256, or responsive to a new attacker, new end user device, or new network identifier associated with end user device 201, among other actions. Although rebroadcasting alert message 261 as alert message 262 may be redundant, the redundancy can provide a more reliable way for alert messages to be transferred between a plurality of content delivery nodes. Furthermore, redundant alert messaging can reduce the time to employ a rate limit across many nodes of a large content delivery system, especially when the initially rate limiting node is located far from other nodes. Each alert message and rebroadcast can include additional information, such as new network addresses of end user device 201 or other attacking devices, timestamps of the alert messages, information or identifiers for the content requested, information on the frequency of the attack, information on the rate limit implemented, or other information.

If a CDN receives many alert messages, such as when redundant alert messages are employed, then these alert messages can be additively combined and implemented. For example, if multiple alert messages are received at a first CDN, and the multiple alert messages each include alerts about different end user devices or different end user device IP addresses, then these alert messages can all be applied additively by the first CDN to rate limit all of the IP addresses or end user devices. Alert messages for a particular IP address or for particular content can also have a sunset or aging parameter assigned thereto. For example, a first IP address of an attacker can "timeout" after a predetermined amount of time, so that the IP address is not indefinitely rate limited. A newly received alert message for an end user device rate limit that has been sunset can re-initiate a rate limit for that end user device.

Returning to the elements of FIG. 2, a detailed view of CDN 213 is shown. The detailed view of CDN 213 can reflect the elements of CDN 211-212 as well. CDN 213 can also be an example of CDN 111-113 of FIG. 1, although variations are possible. CDN 213 includes communication interface 280, processing system 281, and memory 282 in this example.

In operation, processing system 281 is operatively linked to communication interface 280 and memory 282. Processing system 281 is capable of executing software stored in computer-readable media, such in memory 282 of processing system 281. When executing the software, processing system 281 drives CDN 213 to operate as described herein. CDN 213 can also include other elements, such as user interfaces, databases, computer systems, distributed storage and processing elements, and the like.

Processing system 281 can be implemented within a single processing device but can also be distributed across multiple processing devices or sub-systems that cooperate in executing program instructions. Examples of processing system 281 include general purpose central processing units, microprocessors, application specific processors, and logic devices, as well as any other type of processing device.

Communication interface 280 includes one or more network interfaces for communicating over communication networks, such as packet networks, the Internet, and the like. The network interfaces can include one or more local or wide area network communication interfaces which can communicate over Ethernet or Internet protocol (IP) links. Examples of communication interface 280 include network interface card equipment, transceivers, modems, and other communication circuitry.

Memory 282 can comprise any storage media readable by processing system 281 and capable of storing software. Memory 282 can include volatile and nonvolatile, removable and non-removable media implemented in any method or technology for storage of information, such as computer readable instructions, data structures, program modules, or other data. Memory 282 can be implemented as a single storage device but can also be implemented across multiple storage devices or sub-systems. Memory 282 can comprise additional elements, such as controllers, capable of communicating with processing system 281. In some implementations, the storage media can be a non-transitory storage media. In some implementations, at least a portion of the storage media can be transitory. It should be understood that in no case are the storage media propagated signals.

Software stored on or in memory 282 can comprise computer program instructions, firmware, or some other form of machine-readable processing instructions having processes that when executed by processing system 281 direct CDN 213 to operate as described herein. For example, the software can detect rate limit conditions, such as when an end user device requests content greater than a threshold frequency/rate or when an alert message is received related to another CDN implementing a rate limit, implement a rate limit to reduce or restrict access to content, and transfer alert messages to other CDNs regarding the rate limits, among other operations, such as those described for CDN 111-113 in FIG. 1. The software can also include user software applications. The software can be implemented as a single application or as multiple applications. In general, the software can, when loaded into processing system 281 and executed, transform processing system 281 from a general-purpose device into a special-purpose device customized as described herein.

Referring back to FIG. 1, CDN 111-113, origin servers 140-141, and management system 160 can each include communication interfaces, network interfaces, processing systems, computer systems, microprocessors, storage systems, storage media, or some other processing devices or software systems, and can be distributed among multiple devices. Examples of CDN 111-113, origin servers 140-141, and management system 160 can each include software such as an operating system, logs, databases, utilities, drivers, caching software, networking software, and other software stored on a computer-readable medium. Content delivery system 110, in addition to including CDN 111-113, can include equipment and links to route communications between CDN 111-113 and any of end user devices 130-132, origin servers 140-141, and management system 160, among other operations.

End user devices 130-132 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 170-175 each use metal, glass, optical, air, space, or some other material as the transport media. Communication links 170-175 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-175 can each be a direct link or can include intermediate networks, systems, or devices, and can include a logical network link transported over multiple physical links. Although one main link for each of links 170-175 is shown in FIG. 1, it should be understood that links 170-175 are merely illustrative to show communication modes or access pathways. In other examples, further links can be shown, with portions of the further links shared and used for different communication sessions or different content types, among other configurations. Communication links 170-175 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above.

What is claimed is:

1. One or more non-transitory computer readable media having stored thereon program instructions executable by a content delivery node, that when executed by the content delivery node, direct the content delivery node to:
   cache content from an origin server in order to act as a proxy for the origin server;
   monitor requests for content transferred by at least an end user device to detect when the requests comprise an attack on the content delivery node;
   responsive to detecting the attack on the content delivery node, establish a rate limit in the content delivery node on at least the requests for the content associated with the end user device;
   transfer an indication of the attack comprising the rate limit for delivery to another content delivery node that directs the other content delivery node to apply the rate limit to further requests for the content before the further requests are received by the other content delivery node.

2. The one or more non-transitory computer readable media of claim 1, having further instructions stored thereon, that when executed by the content delivery node, direct the content delivery node to:
   receive a further indication of the attack comprising a modified rate limit from at least the other content delivery node; and
   modify the rate limit in the content delivery node based at least on the modified rate limit in the further indication of the attack.

3. The one or more non-transitory computer readable media of claim 2, having further instructions stored thereon, that when executed by the content delivery node, direct the content delivery node to:
   compare a network address associated with the end user device against a network address included in the further indication of the attack to modify the rate limit in the content delivery node.

4. The one or more non-transitory computer readable media of claim 1, wherein the attack comprises a denial of service (DoS) attack.

5. The one or more non-transitory computer readable media of claim 1, having further instructions stored thereon, that when executed by the content delivery node, direct the content delivery node to:
   establish a request response rate slower than a rate of receipt of the requests for the content to establish the rate limit.

6. The one or more non-transitory computer readable media of claim 1, having further instructions stored thereon, that when executed by the content delivery node, direct the content delivery node to:
   establish a request response rate slower than a rate of receipt of the requests received from the end user device to establish the rate limit.

7. The one or more non-transitory computer readable media of claim 1, having further instructions stored thereon, that when executed by the content delivery node, direct the content delivery node to:
   withhold response to the requests received from the end user device to establish the rate limit.

8. A method of operating a content delivery node, the method comprising:
   caching content from an origin server in order to act as a proxy for the origin server;
   in at least one processing device, monitoring requests for content transferred by at least an end user device to determine when the requests comprise an attack on the content delivery node;
   responsive to the attack on the content delivery node, in the at least one processing device, establishing a rate limit in the content delivery node on at least the requests for the content associated with the end user device and transferring an indication of the attack comprising the rate limit for delivery to at least another content delivery node that directs the other content delivery node to apply the rate limit for further requests for the content before the further requests are received by the other content delivery node.

9. The method of claim 8, wherein the rate limit further directs the other content delivery node to transfer the indication of the attack for delivery to at least one further content delivery node.

10. The method of claim 8, wherein the attack comprises a denial of service (DoS) attack.

11. The method of claim 8, wherein establishing the rate limit comprises establishing a content request response rate slower than a rate of receipt of the requests for the content.

12. The method of claim 8, wherein establishing the rate limit comprises establishing a content request response rate slower than a rate of receipt of the requests only received from the end user device.

13. The method of claim 8, wherein establishing the rate limit comprises withholding response to the requests received from the end user device.

14. The method of claim 8, further comprising:
   receiving a further indication of the attack transferred by the other content delivery node which includes a second network address associated with the end user device that is different than a first network address of the end user device included in the indication of the attack, and modifying the rate limit in the content delivery node based at least on the second network address of the end user device.

15. A content delivery system with one or more cache nodes that cache content for delivery to end users, the content delivery system comprising:
   a first cache node that caches the content for delivery to the end users configured to monitor requests received from at least an end user device for the content to determine when the requests comprise an attack on the first cache node;
   responsive to the attack on the first cache node, the first cache node configured to establish a rate limit on at least the requests received for the content by the first cache node and transfer an indication of the attack comprising the rate limit for delivery to at least a second cache node that caches the content;
   responsive to receiving the indication of the attack, the second cache node configured to apply in the second cache node the rate limit for further content requests received for the content at the second cache node before the further content requests are received by the second cache node.

16. The content delivery system of claim 15, comprising:
   the second cache node configured to transfer the indication of the attack for delivery to at least one further cache node that caches the content.

17. The content delivery system of claim 15, comprising:
   the first cache node configured to establish a content request response rate slower than a rate of receipt of the requests for the content to establish the rate limit.

18. The content delivery system of claim 15, comprising:
the first cache node configured to establish a content request response rate slower than a rate of receipt of the requests only received from the end user device to establish the rate limit.

19. The content delivery system of claim 15, comprising:
the first cache node configured to withhold response to the requests received from the end user device to establish the rate limit.

20. The content delivery system of claim 15, comprising:
the first cache node configured to receive a further indication of the attack transferred by the second cache node which includes a second network address of the end user device that is different than a first network address of the end user device included in the indication of the attack, and modify the rate limit in the first cache node based at least on the second network address of the end user device.

* * * * *